United States Patent
Cedilnik

(10) Patent No.: US 10,697,824 B2
(45) Date of Patent: Jun. 30, 2020

(54) DYNAMIC SENSITIVITY DISTRIBUTED ACOUSTIC SENSING

(71) Applicant: AiQ Dienstleistungen UG (haftungsbeschränkt), Böblingen (DE)

(72) Inventor: Gregor Cedilnik, Gäufelden (DE)

(73) Assignee: AIQ Dienstleistungen UG (Haftungsbeschränkt), Böblingen (DE)

( * ) Notice: Subject to any disclaimer, the term of this patent is extended or adjusted under 35 U.S.C. 154(b) by 171 days.

(21) Appl. No.: 15/918,144

(22) Filed: Mar. 12, 2018

(65) Prior Publication Data

US 2018/0259385 A1    Sep. 13, 2018

(30) Foreign Application Priority Data

Mar. 13, 2017 (GB) .................................. 1703974.4

(51) Int. Cl.
*G01H 9/00* (2006.01)
*G01L 1/24* (2006.01)

(52) U.S. Cl.
CPC ............. *G01H 9/004* (2013.01); *G01L 1/242* (2013.01); *G01L 1/246* (2013.01)

(58) Field of Classification Search
CPC .......... G01H 9/004; G01L 1/242; G01L 1/246
See application file for complete search history.

(56) References Cited

U.S. PATENT DOCUMENTS 5,301,001 A * 4/1994 Murphy ................. G01B 11/22
356/35.5

5,991,479 A * 11/1999 Kleinerman ............. G01J 5/08
250/227.11

(Continued)

FOREIGN PATENT DOCUMENTS

| CA | 2854124 A1 | 5/2013 |
|----|-----------|--------|
| EP | 2772738 A2 | 9/2014 |

(Continued)

*Primary Examiner* — Helen C Kwok
(74) *Attorney, Agent, or Firm* — Robert A. Blaha; Smith Tempel Blaha LLC

(57) ABSTRACT

Provided is a method for determining strain change in an optical fiber. The method includes injecting pulsed radiation into the optical fiber; interfering the radiation backscattered from plural locations within the fiber with reference radiation; detecting plural intensities of the interfered radiation associated with the plural locations; deriving plural temporal phase changes based on the plural intensities; for any target location along the fiber: setting a variable first aggregation range and/or second aggregation range to respective start aggregation range values; a) deriving a first phase aggregation value based on plural temporal phase changes of radiation returning from the first aggregation range including locations behind the target location; b) deriving a second phase aggregation value based on plural temporal phase changes of radiation travelled to a second aggregation range including locations in front of the target location; c) determining a signal (strain indicative value) associated with the target location based on a phase aggregation value difference between the first phase aggregation value and second phase aggregation value; performing the above steps a), b), c) while varying the first and/or second aggregation range values to respective final aggregation range values until a criterion is satisfied.

15 Claims, 6 Drawing Sheets

(56) References Cited

U.S. PATENT DOCUMENTS

| | | | |
|---|---|---|---|
| 6,122,057 A | 9/2000 | Hall | |
| 6,545,760 B1 * | 4/2003 | Froggatt | G01K 11/32 356/35.5 |
| 7,668,411 B2 * | 2/2010 | Davies | G01H 9/004 385/12 |
| 8,705,020 B2 * | 4/2014 | Zhuang | G01D 5/35361 356/73.1 |
| 9,170,149 B2 | 10/2015 | Hartog et al. | |
| 2002/0097636 A1 | 7/2002 | Vakoc | |
| 2007/0165238 A1 * | 7/2007 | Boyd | G01L 1/242 356/478 |
| 2008/0297772 A1 * | 12/2008 | Rogers | G01M 11/3118 356/73.1 |
| 2009/0122319 A1 | 5/2009 | Ronnekleiv et al. | |
| 2012/0067118 A1 * | 3/2012 | Hartog | E21B 41/00 73/152.16 |
| 2012/0139746 A1 | 6/2012 | Chen et al. | |
| 2014/0176937 A1 | 6/2014 | Liu et al. | |
| 2016/0191163 A1 | 6/2016 | Preston et al. | |
| 2017/0045410 A1 * | 2/2017 | Crickmore | G01M 3/002 |
| 2017/0276523 A1 * | 9/2017 | Lally | G01D 5/35361 |
| 2017/0350735 A1 * | 12/2017 | Cheng | G01D 5/35329 |
| 2018/0356210 A1 * | 12/2018 | Moore | G01B 11/161 |
| 2019/0219441 A1 * | 7/2019 | Cedilnik | G01D 5/35316 |

FOREIGN PATENT DOCUMENTS

| | | |
|---|---|---|
| GB | 2489749 A | 10/2012 |
| GB | 2489760 A | 10/2012 |
| GB | 2515574 A | 12/2014 |
| GB | 2518767 A | 4/2015 |
| GB | 2538282 A | 11/2016 |
| WO | WO 2012020814 A2 | 3/2012 |
| WO | WO 2012030814 A2 | 3/2012 |
| WO | WO 2015060981 A1 | 4/2015 |
| WO | WO 2015170116 A1 | 11/2015 |
| WO | WO 2016142695 A1 | 9/2016 |
| WO | WO 2016205955 A1 | 9/2016 |
| WO | WO 2016191163 A1 | 12/2016 |

* cited by examiner

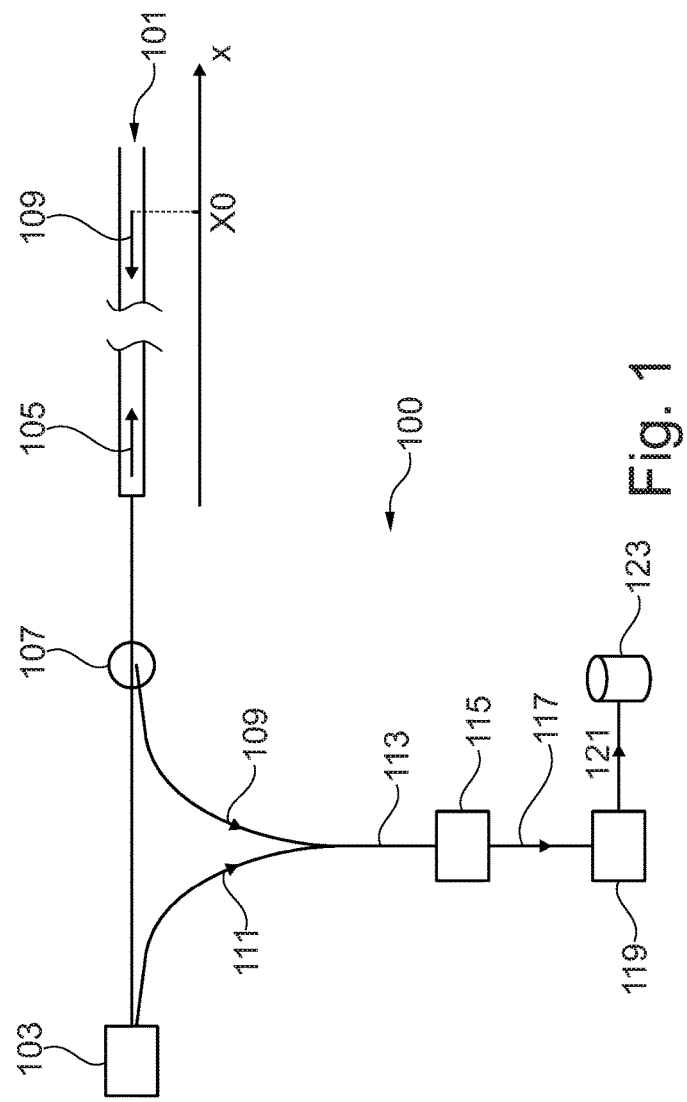
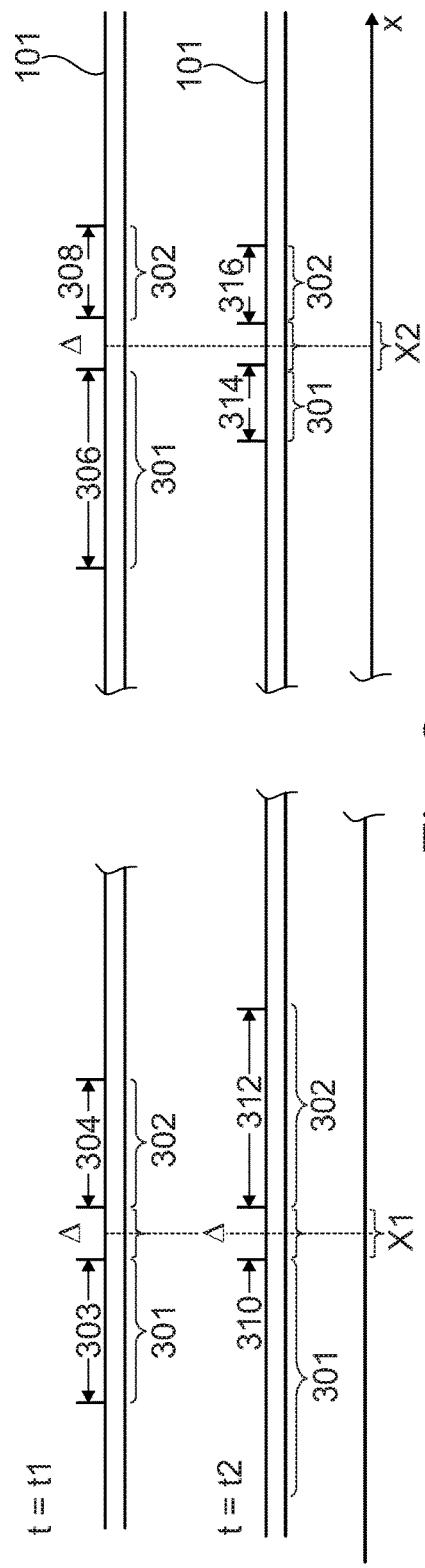
Fig. 1
Fig. 3

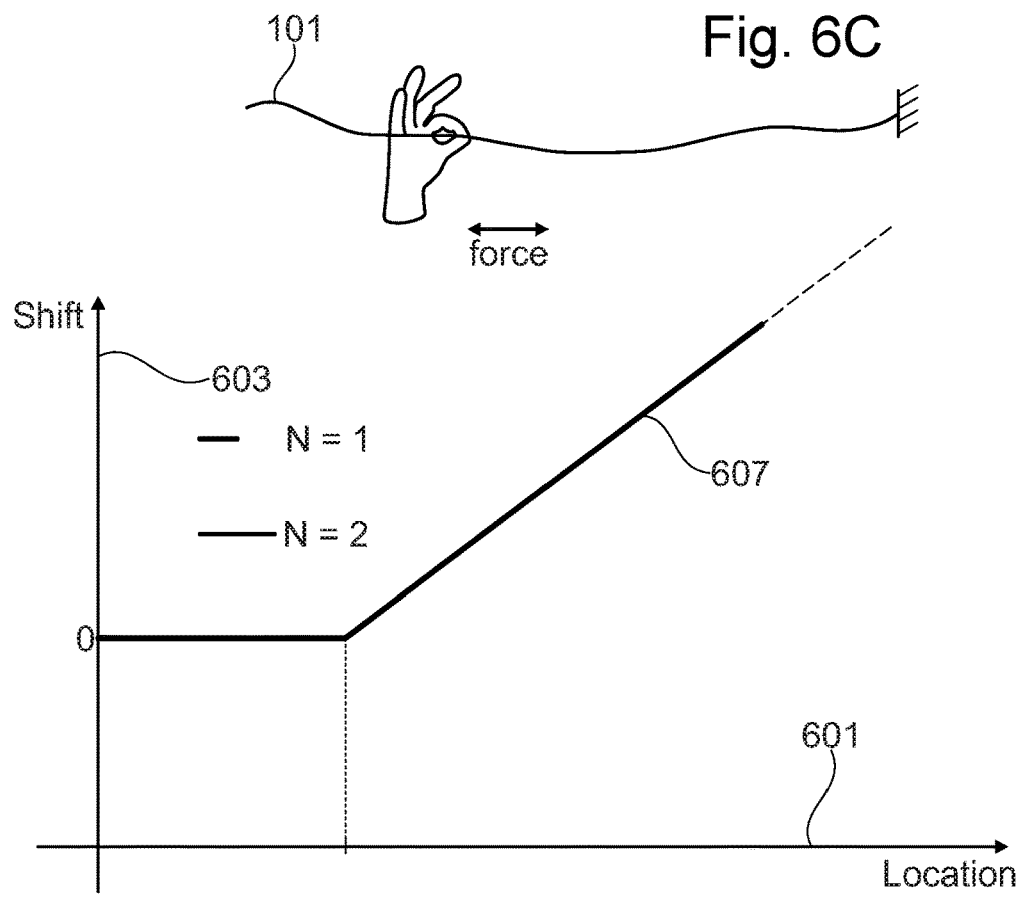
Fig. 6C
Fig. 6A
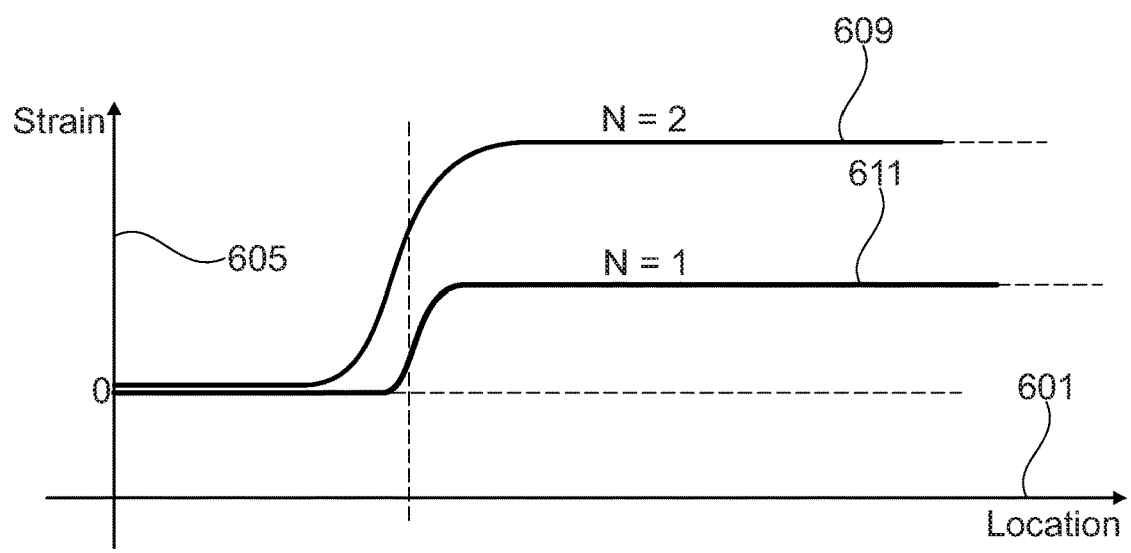
Fig. 6B

DYNAMIC SENSITIVITY DISTRIBUTED ACOUSTIC SENSING

CROSS-REFERENCE TO RELATED APPLICATION

This application claims the benefit of the filing date of Great Britain Patent Application No. 1703974.4, filed on Mar. 13, 2017, the disclosure of which is hereby incorporated herein by reference.

TECHNICAL FIELD

The present invention relates to a method and to an arrangement for determining strain change in an optical fiber.

TECHNOLOGICAL BACKGROUND

Architectures of DAS are known based on sending coherent light pulses into a sensing fiber and either measuring only the intensity of the coherent backscatter in a fiber (like Rayleigh scattering or backscatter from FBGs=fiber Bragg gratings), "DAS-I", or determining also or only its optical phase, "DAS-P". A change in both, the optical intensity and the optical phase, carries information about a change in the local strain of the fiber due to the change of optical path length to the scatter centers or to the fringes of an FBG. So tracking the intensity change and/or phase change allows to reconstruct to some degree an acoustic stimulus causing the strain variation over location and time in the fiber.

DAS-P has the advantage that any shift of fiber scatter centers due to strain linearly translates to a phase shift of the backscatter travelling back along the fiber, thus allowing better quantitative measurement of the strain event causing the phase shift. The phase of the optical backscatter cannot be directly measured due to the lack of detectors able to directly measure the electric field at optical frequencies, so DAS-P architectures employ a form of interference detection.

One way for phase detection is to split the backscatter from the fiber at a receiver side into two paths of different lengths, then combine both paths, thus bringing the coherent backscatter into interference with a temporally shifted version in the manner of an interferometer (like Mach-Zehnder or Michelson). The temporal shift corresponds to a location difference along the fiber, so in effect the backscatter form two different locations (along a "gauge length") of the fiber do interfere, where the path length difference corresponds to about half the gauge length (taking into account two-way propagation).

Another way to derive the phase is to send double pulses into the fiber. The backscatter of both pulses travel back along the fiber, and the signal at any time on the detector corresponds to the interference of the backscatter from different fiber locations, where the location difference (gauge length) in this case corresponds to about half the pulse distance.

In both architectures the measured phase difference between two locations changes only if the optical distance between one location and the other changes by a different amount. The measured phase difference does not change if both locations shift by the same amount, e.g. if the fiber is stretched somewhere before the location, because this would increase the optical path length to both exemplary locations by the same amount.

Another way to derive the phase is to let the backscatter radiation reaching the instrument receiver path interfere with a local oscillator radiation ("LO") which is (to at least some degree) coherent to the backscatter. Architectures are known to extract the backscatter phase information from that interference, like using optical I/Q demodulation (i.e. create two interferograms, where in the second the phase of the LO is shifted by $\pi/2$ with respect to the scatter signal) or by having LO and signal at slightly different frequencies allowing heterodyne detection from the beat signal.

The strain at any location is then derived by calculating the phase gradient, specifically the phase difference between two fiber locations of given distance (gauge length, e.g. 10 m).

The spatial resolution for the DAS strain measurement, i.e. the ability to discriminate adjacent acoustic events on the fiber or to exactly localize an event (e.g. expressed as its meter position along the fiber) depends on the DAS architecture and operating parameters. Depending on the architecture, the spatial resolution can be adjusted by different means. This may be by modifying the pulse parameters (like pulse length or double-pulse distance), the optical geometry (like arm length difference in an interferometer) or by changing the parameters in post-processing like selecting a suitable distance interval along the fiber for the phase difference calculation. Spatial resolution is generally connected to the instruments SNR (i.e. ability to measure/detect weak acoustic events or the maximum sensor length that can be utilized).

The spatial resolution can be adjusted with more or less effort or not at all by changing the measurement instrument setup or calculation parameters, depending on the architecture. Optimizing the spatial resolution for a certain application requires knowledge of the event to be detected (like strength or spatial distribution), so one is either limited to known or expected event properties or needs to re-process the data with a changed spatial resolution (where possible).

US 2012139746 A1 discloses the filtering of a signal from a plurality of distributed strain sensors. A subspace of a measurement space of the obtained signal is selected, wherein the subspace is characterized by a step having a selected step size. The document teaches averaging over time and space, wherein averaging ranges from Taylor development of measured signal (over time and over space) by estimating and minimizing the total error (random and systematic).

EP 2772738 A2 discloses a method for the detection of weak and noisy signals backscattered from a distributed fiber sensor. Therefore, the document discloses a threshold value setting circuit configured to set a threshold value in accordance with a change in an amount of noise overlapped with a measured signal. The method disclosed therein further teaches to switch between spatially averaged measured data and unfiltered data, depending on noise level (threshold).

WO 2015060981 A1 discloses the use of a dynamic window and an adaptive filter to reduce the noise in measured signals from a distributed optical fibre sensor.

U.S. Pat. No. 9,170,149 B2 discloses a distributed fiber optic sensor system with improved linearity, wherein a first optical signal is launched into an optical fiber resulting in a Rayleigh backscatter signal that is mixed with a second optical signal to generate mixed output signals. A phase detection and acquisition system determines a phase difference between first and second locations along the optical fiber based on phase information extracted from the mixed output signal and combines the phase information extracted from multiple acquisitions to detect strain on the optical fiber sensor. To measure vibration or strain, a distributed fiber optic sensing system may measure the amplitude and/or phase of a Raleigh backscatter signal returned from the fiber optic sensor when radiation of a narrowband optical source is injected into the fiber. This document uses a selectable pre-defined distance interval for calculating the phase difference between locations, but does not describe how to select the interval.

Noise from different sources (like laser noise, detector noise, shot noise . . . ) limit the achievable SNR which limits e.g. the minimum detectable acoustic event strength or the sensor reach (when the backscatter signal decreased below a useful level due to fiber attenuation). SNR can be improved e.g. by sending stronger pulses into the fiber, increasing the pulse rate, using low noise optical or electrical amplifiers, by reducing (worsening) the spatial resolution by using longer pulses or larger gauge lengths or by limiting further data processing to a reduced acoustic bandwidth (like filtering high and/or low frequency components). All of them have limits or undesirable side effects. Increasing the pulse power above some limit triggers non-linear effects in the fiber, in effect even reducing the useful pulse power after some distance. The noise level of optical or electrical amplifiers reach physical limits (like shot noise) and technological limits (like limited ability to filter-out EDFA spontaneous emission). Longer pulses and/or gauge lengths or performing some spatial data averaging in post-processing spoil the ability to resolve events that are closer than the gauge length and/or pulse length or spoil the linearity of the result. The maximum pulse rate is limited by the propagation time of a pulse forward and back along the fiber. If a next pulse is sent into the fiber before all radiation from the previous pulse has left the fiber, a disturbing mixing of signals happen.

When applying distributed acoustic sensing methods, the phenomenon called "fading" has been observed. Fading relates or is associated with optical properties of the fiber optical sensor along its length. In an undisturbed fiber, it is observed that the signal scattered back from a particular region of the fiber varies along the fiber. In a particular region of the fiber, scanner centers may be arranged relative to each other such that the backscattered light destructively interferes such that the detector detects a relatively low intensity. In other regions of the fiber, the intensity detected by the detector may be higher, since the destructive interference of the backscattered radiation is not as pronounced. Fading therefore negatively affects measurement intensities and also affects the strain along the fiber has derived from the detected intensities. In particular, there may be regions within the fiber from which very little or no light at all is backscattered. These regions may also be subjected to statistical variation, for example may change with environmental temperature or other external influences.

Thus, a limitation of the DAS architectures is "intensity fading" which is a coherent effect of the quasi-random distribution of Rayleigh scatter centers along the fiber. The backscatter from different scatter centers reaching the detector at the same time (being scattered from different parts of the coherent optical pulse) interfere in a quasi-random way (depending on the distribution of scatter centers) which can be more or less constructive or destructive. Therefore the interference from some parts of the fiber may lead to higher intensities and from other parts to lower intensities or even approach zero. The low signal leads to more noise or makes it impossible when the intensity is low. At such "faded" locations no phase or strain evaluation is then possible.

Conventional methods may not have addressed the problem of "fading" appropriately, for example not with respect to data processing. Instead, the conventional systems and methods have addressed fading by configuring the hardware, such as for example the light source, the parameters of the radiation injected into the fiber, the pulse pattern of the radiation injected into the fiber, the number and kind of detector used for detection of the backscattered radiation, multiple fiber couplers, the line width of the laser source, and so forth. These methods and systems may require to reconfigure and/or supplement the hardware to perform the strain measurements. This may be complex and cost-extensive. A number of publications address the issue how to avoid fading.

WO 2016205955 A1 discloses a fiber optic sensor shaped to have a frequency response that has less spectral fading than a sensor with a rectangular wrapping pattern.

US 2016191163 A1 discloses a fiber optic interferometer controller, wherein multiple detectors can be used to ensure that good quality signals are received along the entire fiber by using a combination of detectors that individually measure good quality signals only at limited locations along the sensing fiber. Multiple detectors, each responding to a single mode or a few modes, can eliminate signal fading.

WO 2016142695 A1 discloses a method for optical sensing using introduced reflection points at pre-determined positions in the fibre. The DAS signal processing can be optimized for use with this fibre by making use of the fact that now all sensing positions between each pair of reflection points measure the same signal. This means, for example, we can measure many positions between reflection points and then average the signals from these positions to improve the SNR. The frequency shift between first order sidebands 1202 and 1203 is proportional to the frequency modulation difference (f2−f1) whereas the frequency shift between second order sidebands 1204 and 1205 is proportional to 2(f2−f1). Therefore, the photo-detector output generates two beat signals, one of which is centered at (f2−f1) and the other at 2(f2−f1). Using a demodulator, the relative optical phase of the beat signals can be measured independently.

WO 2015170116 A1 discloses a fiber optic distributed sensing method that involves applying a predefined variation in frequency (LS) between the pulses of different interrogations and determining any variation in backscatter intensity arising from such predefined variation in frequency.

GB 2518767 A discloses a method and apparatus for optical sensing comprising circulators and multiple fibre couplers with different optical paths through the interferometers, Faraday-rotator mirrors and photodetectors.

US 2014176937 A1 discloses a distributed disturbance sensing device adopting OFDR, polarization controlling and analysis techniques, consisting of a ultra-narrow linewidth tunable laser source module, polarization generating and polarization splitting balanced detecting module.

CA 2854124 A1 discloses a phase sensitive coherent OTDR system including a frequency-shifting circuit to repeatedly translate the frequency of an optical pulse generated by a narrowband source to generate a train of interrogating pulses of multiple frequencies. The optical signals returned from the sensor arrangement in response to the pulse train is mixed on a photodetector with light from the narrowband source that has not been shifted to generate mixed output signals. The mixed output signals are filtered into frequency bands, and the phase for each frequency band is extracted.

GB 2515574 A discloses a distributed optical sensing method wherein a sensor is interrogated by the optical source transmitting a pair of optical pulses into the sensing fibre; and the optical receiver receives a returning composite optical signal, which is sampled and comprises light scattered from at least a region of a sensor.

GB 2489760 A discloses a distributed fibre optic sensing with a phase value based on a quality metric, wherein the processing of the backscatter data involves dividing the plurality of diversity samples into a plurality of processing channels and processing at least some of the channels to determine phase data for the channel.

US 2009122319 A1 discloses non-uniform sampling to extend range of interferometric sensors.

US 2002097636 A1 discloses a folded sensor array, wherein in order to overcome signal fading, a demodulation of the returned signal is required. The typical demodulation technique is the Phase-Generated Carrier (PGC) scheme, which requires a path-mismatched Mach-Zehnder interferometric sensor.

US 2017045410 A1 discloses a method for temperature sensing by strain measurement in an optical fibre. The document teaches that for single pulse systems this is not possible due to the well-known signal fading issue. A series of interrogations are launched into an optical fibre, each interrogation comprising interrogating radiation in at least one pulse pair, wherein the pulses of a pulse pair are introduced to the optical fibre with a time interval therebetween.

GB 2489749 A discloses Fibre Optic Distributed Sensing methods. As the backscatter signal exhibits a polarization dependence simultaneous or near simultaneous interrogation could help avoid problems with fading as the signals from both series may not fade at the same time. Two pulse pairs having different polarization states could be produced in a number of different ways. A single sample may be acquired for each analysis bin or multiple samples may be taken within an analysis bin and averaged together. To ensure that the maximum spatial resolution can be resolved it would therefore be necessary to sample such that the pulse pair had moved by about the gauge length between samples. By oversampling it is possible to generate diversity channels to overcome the problems of fading.

WO 2012030814 A2 discloses a distributed fiber optic sensing system, wherein the incoming backscattered signal is split into any two orthogonal polarization states and mixed each of these with a suitably aligned local oscillator signal. Using this approach has the benefits, that this arrangement avoids polarization fading (i.e., the weakening of the signal when the polarizations of the backscatter signal and LO signal are not the same).

The above mentioned publications propose to modify the measurement setup to address the issue how to avoid fading.

SUMMARY

There may be a need for a method and for a system for determining strain change in an optical fiber which does not require (extensive) adaptation of the measurement equipment or setup, can be performed in a reliable and accurate manner and can simply be implemented.

The need may be solved by the subject-matter of the independent claims. The dependent claims specify particular embodiments of the present invention.

Embodiments of the present invention may use coherent detection and phase-sensitive measurements in an optical time-domain reflectometry (OTDR) system to detect, time-dependent changes of the property of the optical fiber, such as strain.

According to an embodiment of the present invention method is provided for determining strain change in an optical fiber. The method comprising: injecting pulsed radiation into the optical fiber; interfering the radiation backscattered from plural locations within the fiber with reference radiation (e.g. generated by a local oscillator); detecting plural intensities of the interfered radiation associated with the plural locations; and deriving plural temporal phase changes based on the plural intensities.

For any target location along the fiber it is performed:
  setting a variable first aggregation range and/or second aggregation range to respective start aggregation range values; deriving a first phase aggregation value based on plural temporal phase changes of radiation returning from the first aggregation range including locations behind the target location;
  a) deriving a first phase aggregation value based on plural temporal phase changes of radiation returning from the first aggregation range including locations behind the target location;
  b) deriving a second phase aggregation value based on plural temporal phase changes of radiation travelled to a second aggregation range including locations in front of the target location;
  c) determining a signal (e.g. strain indicative value) associated with the target location based on a phase aggregation value difference between the first phase aggregation value and second phase aggregation value; and
  performing the above steps a), b), c) while varying the first and/or second aggregation range values to respective final aggregation range values until a criterion is satisfied.

The signal associated with the target location may indicate the strain strength or the strength of an acoustic signal affected by the strain at the target location.

The optical fiber may be a conventionally available fiber which is adapted to guide electromagnetic radiation, in particular (infrared and/or optical and/or ultraviolet) light. The strain change may for example be caused by an acoustic disturbance of the optical fiber, involving elongations and compressions which may depend on the location along the optical fiber and on time. The acoustic disturbance may for example be associated with a seismic event, to a weather event, or to other events. The radiation injected into the optical fiber may be coherent radiation, such as for example generated by a laser or a laser diode. The pulsed radiation may for example be generated by placing a shutter along a propagation path towards the optical fiber and closing and opening the shutter at predetermined points in time. The pulse width may for example be selected to generate pulses of width for example 1 m to 10 m. Other values are possible. The reference radiation may have the same wavelength as the radiation injected into the fiber or may have a wavelength different than the radiation injected into the fiber. Thereby, a so-called homodyne detection or a heterodyne detection may be performed. When the homodyne detection is applicable, the radiation returning from the optical fiber may be interfered with two reference radiation portions which are shifted by half or a quarter of the wavelength or $\pi/2$, thereby implementing a quadrature detection. When the heterodyne detection is applicable, the reference radiation may have a wavelength different from the wavelength of the radiation injected into the optical fiber. When interfering the reference radiation with the radiation returning from the optical fiber, a beat frequency may be detected corresponding to the difference of frequencies of the reference radiation and the radiation injected into the fiber. Thereby, the signal detected by the detector may be a sine wave at the difference frequency with amplitude modulation and phase modulation. The beat frequency signal may be passed through a rectifier and may be low pass filtered.

Overview of Embodiments

Embodiments of the present invention may interfere the radiation backscattered from the optical fiber with a local oscillator radiation ("LO") which may correspond to the reference radiation. For the quadrature detection (I/U demodulation), for example two detectors may be required. Based on the output signals of the two detectors, the phase information may be extracted.

Radiation backscattered (and then interfered) from a particular target position reaches the detector in an associated time interval, time resolved detection thereby enabling to resolve from which target location the detected interference intensity originated from.

Each temporal phase change may be associated with a difference of the phase detected between two points of time. In particular, each temporal phase change may be associated with a particular location along the fiber at which the radiation is backscattered. The plural temporal phase changes associated with a particular instance in time, for all target locations along the fiber, may be stored in a storage element for further processing.

The first and second aggregation range may include plural locations along the fiber, in particular each range including a continuous interval of locations. The phase aggregation values may for example be calculated as an average or a weighted average or an interpolation of the plural temporal phase changes. The phase aggregation value may therefore be determined in a number of different manners. In particular, aggregation in terms of the disclosed invention may be a collection of measurement values (phase values, optical signal intensity) and the derivation of a value which is representative for said collected values. The representative value may be a weighted, according to the optical signal intensity, average value or the arithmetic average or a value from a curve fitted to the collection of values or a supremum of the collection or the median of the collection. It will be appreciated by the skilled person to complete the list of manners to derive the aggregation phase values including applying a de-noising method.

The first phase aggregation value may thus be for example a (weighted) average of the plural temporal phase changes of radiation returning from the first aggregation range including locations behind the target location. The second phase aggregation value may for example be a (weighted) average of the plural temporal phase changes of radiation travelled to the second aggregation range including locations in front of the target location.

The target location may itself be associated with a particular interval (e.g. depending on the spatial resolution desired or possible) around a target point along the optical fiber. The target location may for example include an interval of 1 m having as a center a target point. The signal associated with the target location may be indicative for the strain at the target location. The signal associated with the target location may be indicative for a temporal phase change at the target location, having an improved signal-to-noise ratio compared to conventional methods.

According to embodiments of the present invention, only the first, only the second, or both the first and the second aggregation range values are varied from one step of the loop to another step within the loop. The method may be performed live, thereby continuously acquiring further intensities by continuing injecting pulse radiation into the optical fiber. For example, a time resolution may be 1 s to 1 min, in particular between 1 s and 10 s, for example. Spatial resolution may be for example between 50 cm and 10 m, in particular between 1 m and 3 m, for example. Time resolution and/or spatial resolution may be adapted by appropriately selecting the pulse pattern of the radiation, such as appropriately selecting the pulse width and/or duty ratio.

The properties of the fiber including the presence or absence of regions leading to fading, may affect and influence the first and/or second aggregation range values, in particular the final aggregation range values. Thereby, advantageously, so-called "fading" can be dealt with.

According to an embodiment of the present invention, the first aggregation range covers an interval of locations having a width which is different from a width of an interval covered by the second aggregation range. For example, when behind the target location, a region leading to fading is present and in front of the fiber, less fading may be present than behind the fiber, the width of the first aggregation range may be larger than the width of the second aggregation range. In other embodiments, the reverse may be applicable. The width of the first and/or second aggregation range may be larger, in particular between two times and ten times, than the width of the target location.

According to an embodiment of the present invention, setting the variable first aggregation range and/or the second aggregation range to respective start aggregation range values comprises: setting a first variable interval to a first interval start value; setting a second variable interval to a second interval start value; wherein the first aggregation range includes locations between the target location and a first location which is by the first variable interval behind the target location, wherein the second aggregation range includes locations between a second location, which is by the second variable interval in front of the target location, and the target location, wherein the value of the first variable interval is varied to a first final interval value and the value of the second variable interval is varied to a second final interval value until the criterion is satisfied.

Thereby, the first aggregation range and the second aggregation range may be immediately adjacent (to the right and to the left) to the target location. Thus, in particular, no space may be between the target location and the first aggregation range and no space may be between the second aggregation range and the target location. Thereby, the accuracy and/or signal-to-noise ratio of the signal associated with the target location (indicating an improved temporal phase change or temporal phase change having improved signal-to-noise ratio) may be improved. Thereby, the method may be simplified.

According to an embodiment of the present invention, the first final and/or first start interval value is different from the second start and/or second final interval value, respectively. Thereby, different optical properties of the optical fiber before and behind the target location can be taken into account and at least partly compensated.

According to an embodiment of the present invention, the first final and/or first start interval value is equal to the second final and/or second start interval value, respectively. Thereby, the method may be simplified. For example, during varying the first and second interval values, the first and the second interval value may be changed by a same amount. The first and second interval may be defined by the number of basic length units. One basic length unit (e.g. corresponding/being equal to the desired or possible spatial resolution) may for example correspond to between 1 m and 10 m, in particular 1 m, or may be the same as the width of the target location. Thus, the first and/or second intervals may be characterized by natural numbers indicating their widths in terms of the number of base length intervals.

According to an embodiment of the present invention, the first start interval value and/or the second interval start value is a predetermined minimal interval value, and varying the interval values involves increasing the interval values from the minimal interval value. When the interval values start at the minimal interval values, only strong acoustic events or strong strain changes or strong optical signals may be detectable. Less strong acoustic events or less strong strain changes or less strong optical signals (e.g. due to "fading") may not be detectable when the minimal interval values are used. Therefore, for detecting lower strength acoustic events (and/or events at locations where fading results), the interval values may be increased step by step and in each round further locations or further strain changing events may be detectable at other target locations. In a next round, previously found target locations at which a detected strain change event has been detected or associated, may be skipped. Thereby, effectively, strain changing events of different strengths may be detectable which may not have been possible in the conventional systems and methods.

According to an embodiment of the present invention, the first start interval value and/or the second interval start value is a predetermined maximal interval value, and varying the interval values involves decreasing the interval values from the maximal interval value. According to this embodiment, in a first analysis round, very low strain changing events or in general optical signals may be detectable. Subsequently, the interval values may be decreased, possibly leading to a disappearance of some signals at particular target positions which have relatively low strength, but prevailing signals at target positions where relatively high strain changing events (or having high optical signals) occurred. For these remaining target positions at which higher strain changing events occurred, the interval values may further be decreased, in order to improve the spatial resolution of the exact target locations. Decreasing the interval values generally may lead to an improvement of the spatial resolution, while decreasing the signal-to-noise ratio. Increasing the interval values may generally lead to a decrease of the spatial resolution, but to an increase of the signal-to-noise ratio. An appropriate compromise between desired resolution and desired signal-to-noise ratio may be applied.

According to an embodiment of the present invention, the first start and/or second start interval value and/or the first final and/or second final interval value is dependent on the target location and/or on time and/or on at least one signal (strain indicative value) associated with the target location determined for a past time. For example, if from the target location, relatively low backscattering occurs, the interval values may be increased. The dependence on time may be understood in the sense that the acoustic disturbance of the fiber varies with time. Thus, signal intensity backscattered from a particular target location may correspondingly change with time. For example, signal strength backscattered from a particular target location may increase from a first intensity to a second intensity between two time points. For the first intensity, a higher (e.g. final) interval value may be determined, than for the second intensity detected at the later time point. Thus, the aggregation ranges and also the interval values may dynamically change with time and may also vary along the different target positions along the fiber. Thereby, detection of strain events having different strengths and/or which are located at locations of the fiber having different degree of "fading" may be performed.

According to an embodiment of the present invention, the smaller the signal associated with the target location is due to fading, the larger the first start and/or second start and/or first final and/or second final interval values are selected. Thereby, the problem of "fading" may effectively be addressed and at least be reduced. Thus, the method does not allow only to detect relatively low acoustic strain changing events but may also allow to reduce the influence of (acoustic strain changing event independent) properties of the optical fiber along its length. Thus, the inherent inhomogeneity along the fiber with respect to inherent backscattering efficiency (including destructive and constructive interference from scattering elements) can be at least partly compensated and addressed.

According to an embodiment of the present invention, determining whether the criterion is satisfied involves: determining that the signal associated with the target location is above a noise level, e.g. strain indicative value reliably and/or significantly indicates a strain causing event. The noise level may be known (in particular also independent of different widths of the first and/or second aggregation range), for example from calibration measurements or from data sheets of the optical equipment and the detector. For example, for each width of first and/or second aggregation range, the noise level may be known. If the signal associated with the target location (as detected having set a particular first and/or second aggregation range), is above the noise level, a strain changing acoustic event may have reliably be detected. Thus, this target location may be excluded from further analysis.

The signal associated with the target location may indicate the strain strength or the strength of an acoustic signal affected by the strain at the target location.

According to an embodiment of the present invention, determining whether the criterion is satisfied involves: determining that the first location lies in a region behind the end of the fiber, and/or determining that the second location lies in a region in front of the fiber.

According to an embodiment of the present invention, determining whether the criterion is satisfied involves: determining that first and/or second interval value is equal to or larger than a maximal interval value. Thereby, infinite loops may be avoided.

According to an embodiment of the present invention, determining whether the criterion is satisfied involves: determining that the first aggregation range and/or the second aggregation range includes at least one other target location for which a significant signal has already been determined. When a significant signal has already been determined (using previously applied width of first and/or second aggregation range or using first and/or second interval values), this may be excluded from the aggregation for calculating phase changes at other locations.

According to an embodiment of the present invention, the method is performed looping over all target locations with the first start and/or second start interval value, modifying the first and/or second interval value and looping over all target locations, thereby skipping those for which the criterion is satisfied. At least two intercalated loops may be performed during the method. An outer loop or inner loop may loop over different target locations and an inner loop or an outer loop may loop over different widths of aggregation ranges or different interval values (for example first and/or interval values). Varying the interval values (or widths of aggregation ranges) may be the outer loop according to this embodiment. Thereby, target locations having a particular strength of strain causing events or having particular backscattering properties at the target locations may be identified by looping over different target locations with given interval values (or widths of aggregation ranges). This may support particular applications, where the detection of only strain causing events having a particular strength is desired.

It should be understood that features, individually or in any combination, disclosed, described, applied for a method for determining strain change in an optical fiber are, individually or in any combination, also applicable to an arrangement for determining strain change in an optical fiber according to an embodiment of the present invention and vice versa.

According to an embodiment of the present invention it is provided an arrangement for determining strain change in an optical fiber, the arrangement comprising: a light source configured to inject pulsed radiation into the optical fiber; equipment for interfering the radiation backscattered from plural locations within the fiber with reference radiation (e.g. local oscillator radiation); a detector configured to detect plural intensities of the interfered radiation associated with the plural locations; a processor configured to derive plural temporal phase changes based on the plural intensities; and to perform for any target location along the fiber:

setting a variable first aggregation range and/or second aggregation range to respective start aggregation range values;

deriving a first phase aggregation value based on plural temporal phase changes of radiation returning from the first aggregation range including locations behind the target location;

deriving a second phase aggregation value based on plural temporal phase changes of radiation travelled to a second aggregation range including locations in front of the target location;

determining a signal (e.g. strain indicative value) associated with the target location based on a phase aggregation value difference between the first phase aggregation value and second phase aggregation value;

performing the above steps a), b), c) while varying the first and/or second aggregation range values to respective final aggregation range values until a criterion is satisfied.

The processor may be implemented in hardware and/or software. The light source may for example be a coherent laser light source or laser diode. The reference radiation may have a same or a different wavelength than the radiation injected into the optical fiber. The optical fiber may for example have a length between 1 km and 50 km.

Embodiments of the present invention are now described with reference to the accompanying drawings. The invention is not restricted or limited to the illustrated or described embodiments.

BRIEF DESCRIPTION OF THE DRAWINGS

FIG. 1 schematically illustrates an arrangement for determining strain change according to an embodiment of the present invention;

FIG. 3 schematically illustrates measurement ranges in an optical fiber as used in embodiments of the present invention;

FIGS. 6A and 6B illustrate results of observed strain applied according to FIG. 6C with different aggregation widths;

DETAILED DESCRIPTION OF EXEMPLARY EMBODIMENTS

Figure 2A:
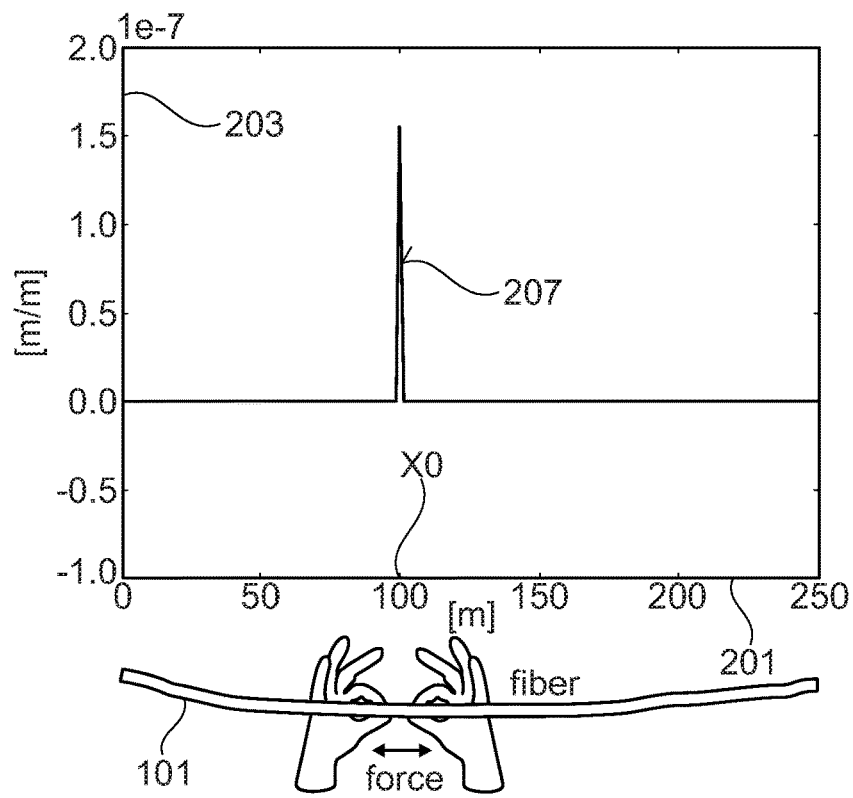
FIGS. 2A, 2B illustrate graphs of a measurement property exploited in embodiments of the present invention.

The arrangement 100 for determining strain change in an optical fiber according to an embodiment of the present invention which is adapted to perform a method for determining strain change according to an embodiment of the present invention comprises a light source 103 configured to inject a pulsed radiation 105 into the optical fiber 101. The arrangement 100 further comprises equipment 107 for interfering/deflecting radiation 109 backscattered from plural locations x0 from the fiber 101 with reference radiation 111. Thereby, the interfered radiation 113 is coupled into a detection system 115. The reference radiation 111 may have the same frequency and/or a different frequency than the radiation 105 injected into the fiber 101. Depending on the type of reference radiation 111, the detection system 115 may be configured differently.

For example, if the reference radiation 111 has the same wavelength as the radiation 105 injected into the fiber 101, the detection system 115 may interfere the radiation 109 returning from the fiber 101 with a first and a second reference radiation portion which are shifted by half or a quarter of the wavelength and may then be adapted to detect the two intensities of the two interfered radiation portions independently using two detectors. Thereby, using quadrature detection, the phase information of the backscattered radiation 109 may be determined.

Alternatively, if the reference radiation 111 has a different wavelength than the radiation 105 injected into the fiber 101, a beat signal may be detected by a detector of the detection system 115 and from the phase and amplitude modulation, the phase information associated with the backscattered radiation 109 may be derived.

Thus, the detection system 115 is configured to detect plural intensities 117 of the interfered radiation 113 associated with the plural locations x0 and transmits these detected intensities 117 to a processor 119. Depending on the propagation time of the backscattered radiation 109, the location x0 from where the backscattering resulted can be determined. The plural intensities 117 are detected over time, e.g. for subsequent pulses of the radiation 105 enabling to derive therefrom plural temporal phase changes.

The processor 119 further sets, for any target location x0 along the fiber 101, a variable first aggregation range and/or a variable second aggregation range to respective start aggregation range values. Further, the processor 119 is configured to derive a first phase aggregation value based on the plural temporal phase changes of radiation returning from the first aggregation range including locations behind the target location; and to derive a second phase aggregation value based on plural temporal phase changes of radiation travelled to a second aggregation range including locations in front of the target location x0.

The processor may store the plural intensities 117 and/or the plural temporal phase changes derived therefrom, labeled with reference sign 121 in a storage element 123, wherein each temporal phase change is associated with a particular target location and time. The processor 119 further determines a signal associated with the target location (in particular being proportional to an improved temporal phase change associated with the target position) based on a phase aggregation value difference between the first phase aggregation value and the second phase aggregation value. The processor 119 further performs the steps of deriving the first phase aggregation value, deriving the second phase aggregation value and determining the signal associated with the target location while varying the first and/or the second aggregation range values to respective final aggregation range values until a criterion is satisfied.

Thus, the arrangement 100 employs distributed acoustic sensing including phase detection, wherein phase detection is performed by interfering the backscatter radiation 109 with a local oscillator radiation, as is represented by the reference radiation 111. The data processing is improved to overcome or at least reduce the above-mentioned limitations of the signal-to-noise ratio, spatial resolution and "dead zone" (due to intensity fading) depending on the acoustic signals of interest at given times and locations.

Figure 2B:
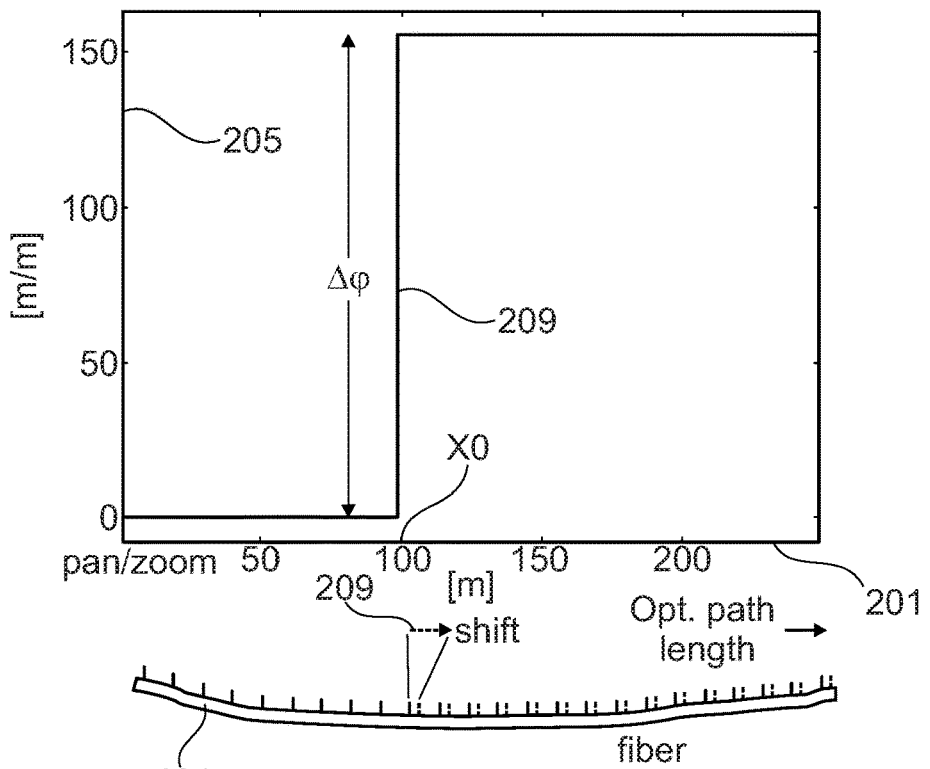

FIGS. 2A and 2B illustrate properties of local oscillator distributed acoustic sensing (DAS). Therein, the abscissas 201 denote the location along the fiber, while the ordinate 203 in FIG. 2A denotes the strain or force applied at the fiber 101 while the ordinate 205 in FIG. 2B denotes the phase-shift of the backscatter radiation 109. In the example illustrated in FIG. 2A, a Δ-peak shaped strain 207 is applied at a target location x0 which is at 100 m. The local oscillator DAS has the property that a strain at one location (for example x0) effects the optical phase of all the Raleigh backscatter behind that disturbance till the end of the fiber in an "integral" fashion. Behind the location x0 where strain 207 was applied, all scatter centers of the fiber are shifted regarding the optical path length as illustrated in the curve 209. Behind the location x0 where the strain is applied, all scatter centers of the fiber 101 are shifted by an amount Δφ regarding the optical path length, leading to a change in the shift φ with respect to the known strain condition. Thereby, the measurement results from all fiber locations behind the location x0 where the strain according to curve 107 was applied, carries the information of that one strain event 207.

FIG. 3 schematically illustrates portions of the fiber 101 including aggregation ranges as used in embodiments according to the present invention. At a point in time t=t1, for example improved phase change values are derived according to embodiments of the present invention at a first target position x1 and a second target position x2. The first target position x1 may for example be defined by a target point in the center of a basic length interval Δ. In front of the first target location x1, a first aggregation range 301 is depicted having a width 303. Behind the first target location x1, a second aggregation range 302 is depicted having a width 304. The first and the second aggregation ranges 301, 302 are immediately adjacent to the first target location x1 and have a same width, i.e. the width 303 equals the width 304.

At the same point in time t=t1, a first aggregation range 301 and a second aggregation range 302 is also associated with a second target location x2. However, the first aggregation range 301 has a width 306 which is larger than the width 308 of the second aggregation range 302 and which is also larger than the widths 303, 304 of the aggregation ranges 301, 302 of the first target position x1. These different aggregation ranges are determined according to embodiments of the present invention to improve the signal-to-noise ratio for different target locations along the fiber 101.

At a second point in time t=t2, the widths of the aggregation ranges 301, 302 in front of and behind the first target location x1 have changed to widths 310, 312, respectively, since a strain causing event, such as an acoustic disturbance at the first target location x1, decreased in its strength. Therefore, the widths 310, 312 are greater at the second point in time t2 than at the first point in time t1, in order to still detect the lower strain causing event.

Conversely, at the second point in time t2, the first aggregation range and the second aggregation range 301, 302 associated with the second target position x2 have been changed to have a width 314, 316, respectively, which is smaller than the width at the first point in time t1 and wherein the widths of the aggregation ranges before and behind the second target position x2 are now the same. This may be due to an acoustic strain causing event at the second point in time at the second target position x2 being greater than at the first point in time t1, allowing to shorten the aggregation ranges 301 and 302 and still being able to detect the strain causing event.

The strain event is due to the property as depicted in FIGS. 2A and 2B coded in a huge statistical plurality of fiber shifts all along the fiber behind the strain event, yielding the change to measure the strain with excellent signal-to-noise ratio.

Figure 4A:
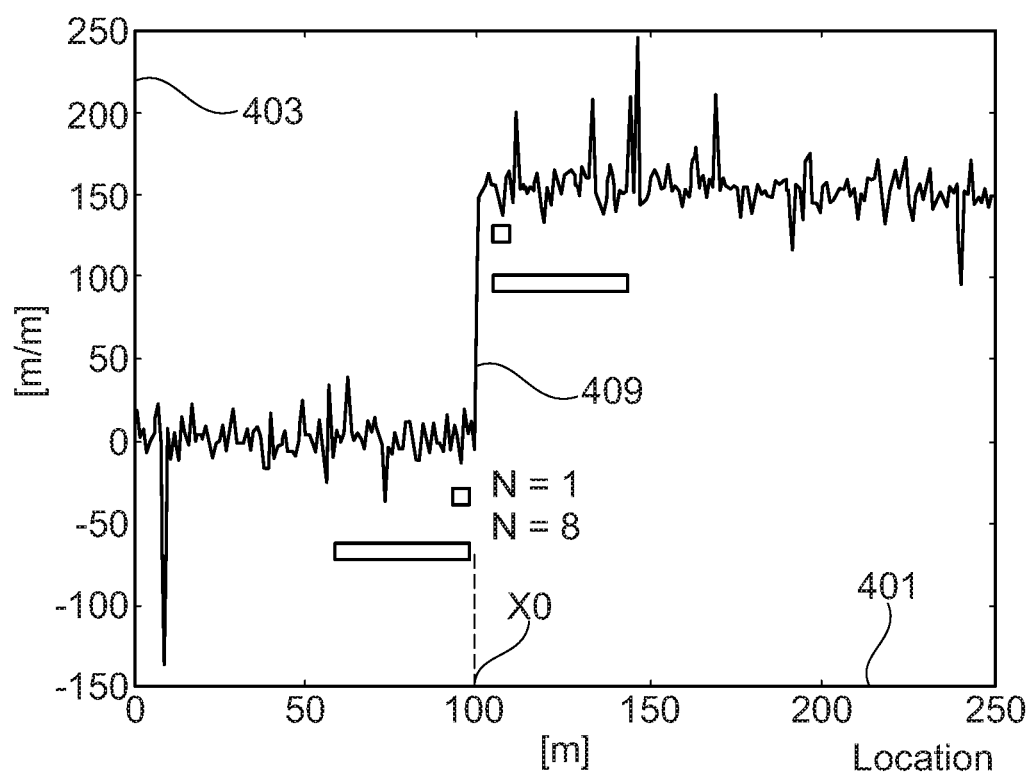
FIGS. 4A and 4B illustrate graphs of a signal intensity as achieved in the embodiments of the present invention.
Figure 4B:
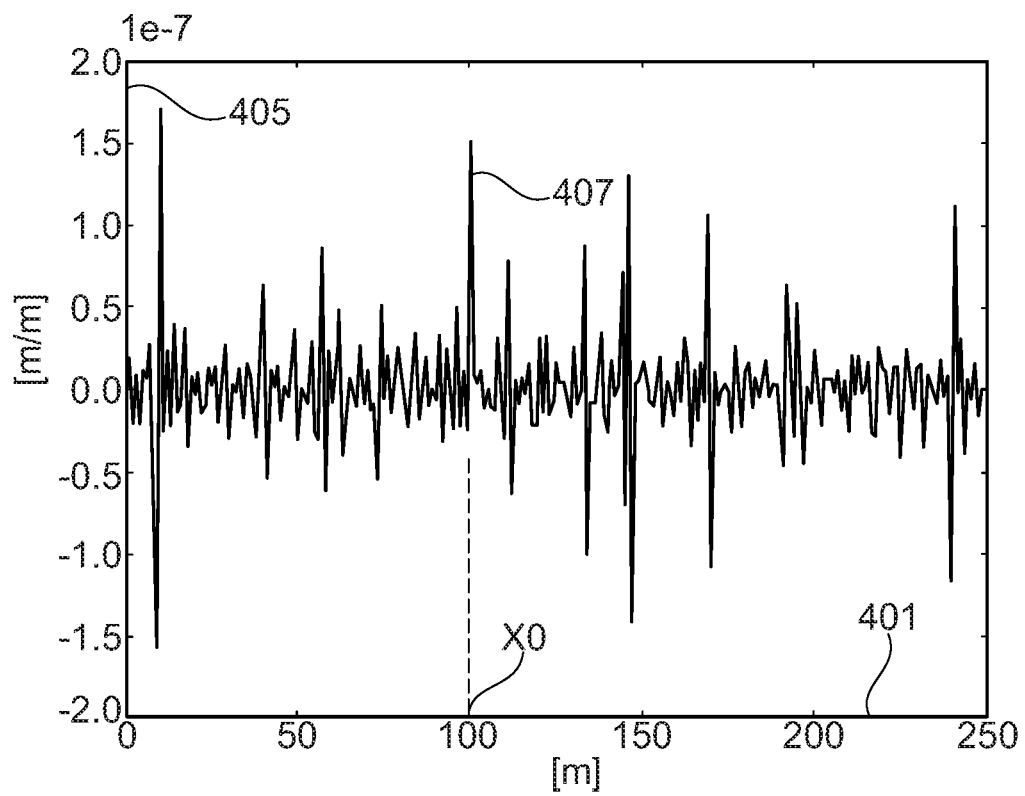

FIGS. 4A and 4B illustrate graphs, wherein the abscissas 401 denote the location along the fiber while the ordinate 403 in FIG. 4A denotes the phase-shift, while the ordinate 405 of FIG. 4B denotes a strain stimulus, for example in acoustic signals varying along the fiber. The stimulus signal 407 comprises an acoustic stimulus at a target location x0 at about 100 m. The curve 409 depicts a determined improved phase-shift for the target location x0 at 100 m as has been derived using an embodiment of the present invention. Thereby, the first and second aggregation ranges have been set to have same widths of eight basic length units (N=8), for example. One should note that a simple averaging of the strain result in FIG. 4A would not reveal the acoustic event.

Figure 5:
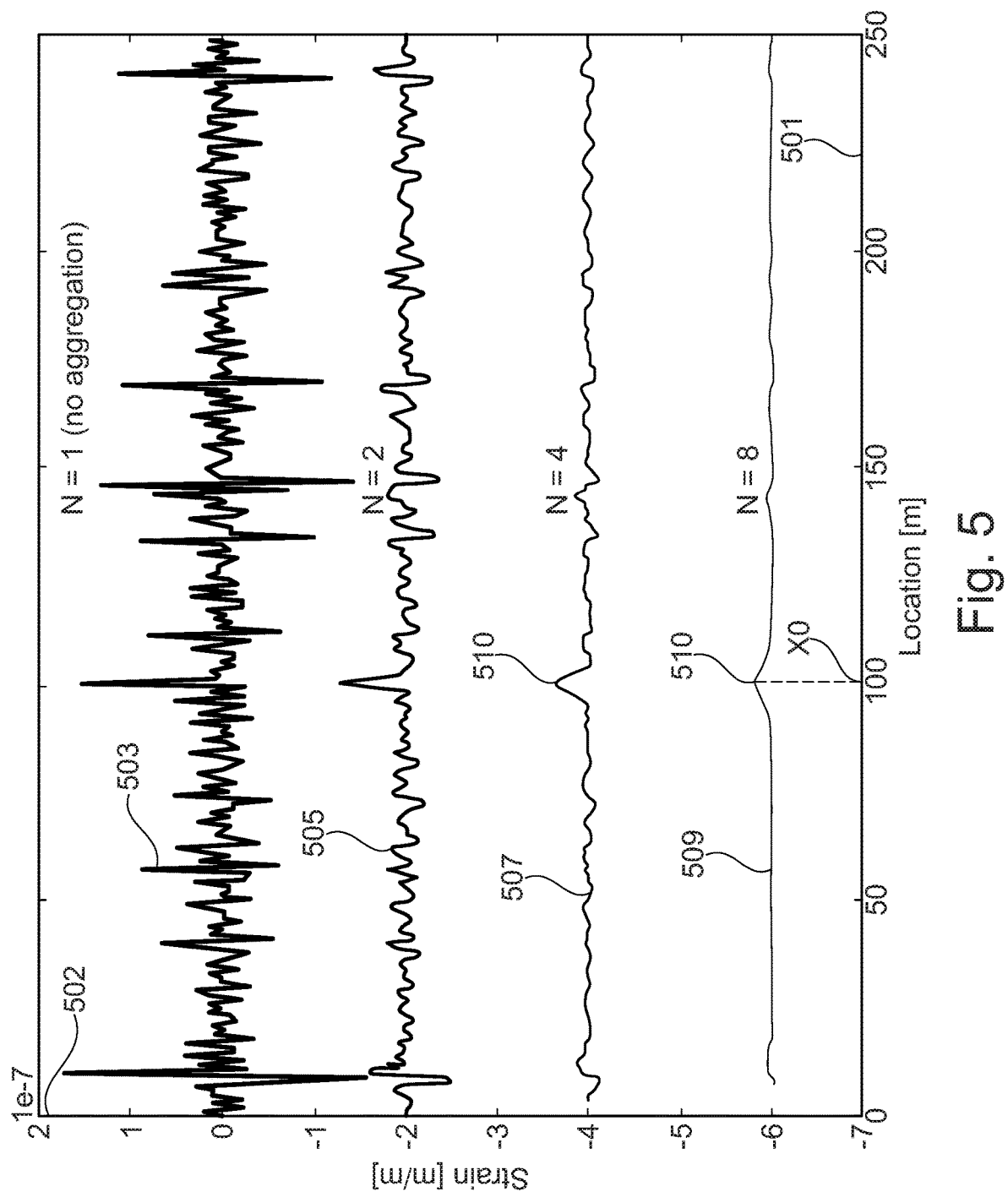
FIG. 5 illustrates intensities as observed for different aggregation ranges according to embodiments of the present invention.

FIG. 5 illustrates a phase-shift as determined in a conventional manner (curve 503), a phase-shift determined using N=2 (curve 503), a phase-shift as determined using N=4 (curve 507), and a phase-shift using N=8 (curve 509). Thereby, N denotes the number of base length units (e.g. having width such as 1 m or 2 m or 3 m) comprised within the first aggregation range in front of and the second aggregation range behind the target position or target location x0, here at 100 m. Again, the abscissa 501 in FIG. 5 denotes the location along the fiber 101 and the ordinate 502 denotes the phase-shift as determined for the backscattered radiation.

As can be taken from the curve 503 in FIG. 5 illustrating the conventional result of a phase-shift, the acoustic strain causing event occurring at the target position x0 cannot be reliably detected. However, increasing the widths of the first and second aggregation ranges allows to detect the strain causing event due to a peak 510 of the determined improved phase difference at the target location x0 being above a noise level.

According to embodiments of the present invention, the "integral" phase evolution information is aggregated (i.e. the difference between two traces from two consecutive laser pulses) from left of the event (or generally left of any location/region) and right of the event. "Phase" may be in the form of unwrapped angle values or as complex phasor representation. Aggregation may be any form of averaging and integration over a fiber range (or more generally over a set of points) and may involve the signal intensity information as an indicator of the significance of each point result like as a weighting parameter per location. This way faded locations/regions or locations/regions of low Raleigh signal may be aggregated without low weight or skipped.

According to an embodiment of the present invention, the determination of the improved phase-shift may be performed as follows.

At each fiber location (or target location, for example x0), the strain (or the phase-shift) is determined based on a low starting aggregation range n (for example first and second aggregation range having low or small widths). This may detect only strong strain causing acoustic events (i.e. sufficiently above the noise level which may be high due to low aggregation). Then a loop may be run through where the aggregation range width (here represented as the number N of basic length units defining the width of the aggregation range) is increased and the analysis is repeated. Thereby, locations/regions may be skipped which have already detected events. The noises in the averaged strain (both, left and right of the location) may decrease statistically with increasing N (or widths of the aggregation ranges) (i.e. with the square root of N when caused by random noise). This means that the algorithm may start with the least signal-to-noise ratio detection limit.

With decreasing noise due to the higher aggregation range width (higher N), the significance level for identifying a real strain may decrease, i.e. weaker strain events may be identified with sufficient confidence. Additional (weaker) acoustic events may then be found in each round of the loop.

Increasing the width of the aggregation range (increasing N for example) may stop until a) an event is significantly identified at a respective location or b) the fiber end is reached or c) a suitable upper limit for N is reached or d) the aggregation range reaches fiber locations/regions where already an event was detected or e) the averaged range is reaching certain asset regions.

The algorithm may have the following properties: The weaker a real strain event is, the larger the width of the aggregation range may be determined and the broader is the spatial signal spread (for example the width of the peak 510 in FIG. 5). N may be in general a distribution over location and may change over time, thus may determine a sensitivity over location and time. Thereby, dynamic ranges may be set. Locations, regions where no significant acoustic event or strain event is found may be marked as "insignificant" and may be excluded from further data processing or storage/archiving. The algorithm may loop through all values for an aggregation range width (all values of N) per fiber location, may in another embodiment loop over all fiber locations with a given N and then modify N. In this way, the algorithm may first search for strong events along the fiber, and then increase N to find weaker events. The search for weaker events then may exclude regions of strong events.

The aggregation parameters may be calculated from the DAS data over consecutive pulse cycles (phase traces) or may generally take into account data from any two or more cycles over time, especially over contiguous time intervals. In one embodiment, the aggregation parameters may be calculated (thus adjusted to a change acoustic stimulus situation) in every 0.25 s or between every 0.25 s and 1 s, for example.

According to embodiments of the present invention, the spatial resolution and/or signal-to-noise ratio may vary along the optical fiber. The aggregation ranges (or aggregation range widths) may differ for the left and the right side of the respective target location. The algorithm may not be using a "selected interval" in the sense of a pre-defined, constant distance interval along the fiber.

The strain result may be normalized depending on the size N of the aggregation range (for example by scaling with 1/N) to compensate the strain scaling. The effect of the normalization may be that the area under the strain peak stays the same regardless of N, corresponding to the (underlying real) fiber shift. Without normalization, the strain peak height would be the same for any N, but due to signal spread the width would change and thus (without taking N into account) pretend in much stronger underlying fiber shift. Also in the case of wider applied strain, normalization may allow to receive the correct strain amplitude regardless of the used N.

Without normalization, the calculated strain value would scale with N as shown exemplary in FIGS. 6A and 6B below. The abscissas 601 in FIGS. 6A, 6B denote the location along the fiber, the ordinate 603 in FIG. 6A denotes the phase-shift and the ordinate 605 in FIG. 6B denotes the strain result (for example proportional to the improved phase-shift as determined according to embodiments of the present invention). The curve 607 denotes the shift. The curve 609 indicates the calculated strain value without normalization for N=2 and the curve 611 denotes the calculated strain value with N=1. According to embodiments of the present invention, the normalization is performed in order to avoid that the calculated strain scales with the aggregation range widths or scales with N. FIG. 6C schematically illustrates the experimental setup leading to the results depicted in FIGS. 6A and 6B.

Figure 7A:
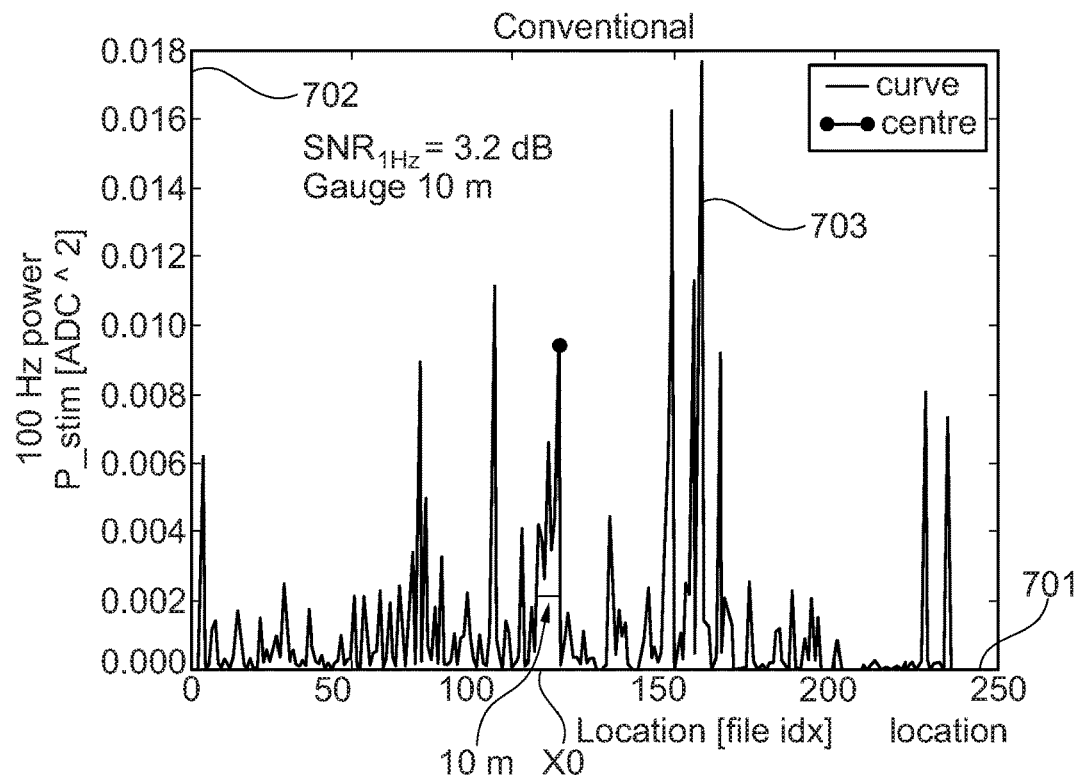
FIGS. 7A and 7B illustrate graphs of measurement data as obtained in embodiments of the present invention.
Figure 7B:
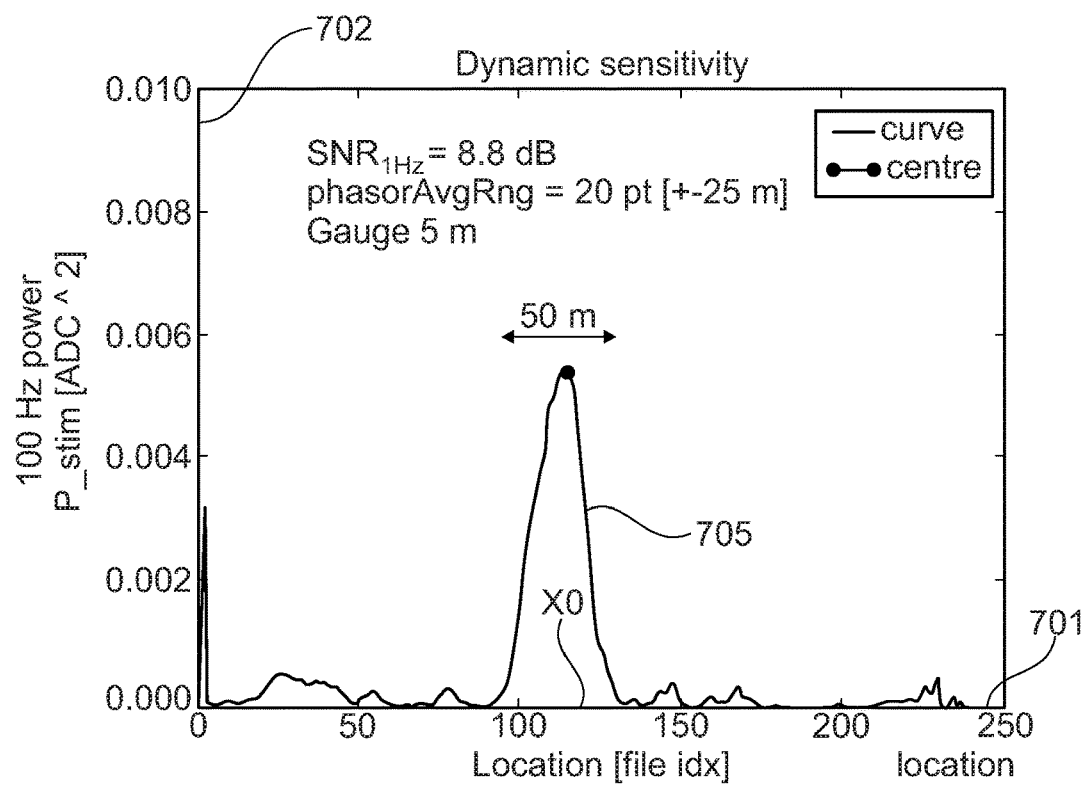

FIGS. 7A and 7B illustrate a conventional signal trace 703 and a signal trace 705 according to embodiments of the present invention representing calculated phase-shifts, wherein the abscissa 701 denotes a location along the fiber while the ordinates 702 denote calculated phase-shifts or strain results. Herein, at a target position x0 at about 110 m in a region of 1 m, the fiber was acoustically disturbed with an acoustic signal having a frequency of 100 Hz. Then, a conventional method resulted in the signal trace 703, while a method for determining strain change according to an embodiment of the present invention resulted in the signal trace 705 illustrated in FIG. 7B. As can be appreciated from the trace 703, not only at the target position x0 where the acoustic disturbance is applied, significant signals are detected but also at multiple other locations. The noise does not allow to reliably determine the location and strength of the acoustic stimulus. The real vibration cannot be distinguished from the noise when the measurement data are evaluated in a conventional manner. However, with the method according to embodiments of the present invention, the strain causing event at the target location x0 can reliably be detected. As can be taken from the conventional trace 703, the intensity of the backscattered signal strongly varies along the optical fiber due to "intensity fading" alternating with regions of no or less intensity fading.

It should be noted that the term "comprising" does not exclude other elements or steps and the "a" or "an" does not exclude a plurality. Also elements described in association with different embodiments may be combined.

The invention claimed is:

1. A method for determining strain change in an optical fiber, the method comprising:
   injecting a pulsed radiation into the optical fiber;
   interfering the radiation backscattered from plural locations within the fiber with a reference radiation;
   detecting plural intensities of the interfered radiation associated with the plural locations;

deriving plural temporal phase changes based on the plural intensities;
for any target location along the fiber:
setting at least one of a variable first aggregation range and a second aggregation range to respective start aggregation range values;
a) deriving a first phase aggregation value based on plural temporal phase changes of radiation returning from the first aggregation range including locations behind the target location;
b) deriving a second phase aggregation value based on plural temporal phase changes of radiation travelled to the second aggregation range including locations in front of the target location;
c) determining a signal associated with the target location based on a phase aggregation value difference between the first phase aggregation value and second phase aggregation value;
performing the above steps a), b), c) while varying at least one of the first aggregation range value and the second aggregation range value to respective final aggregation range values until a criterion is satisfied.

2. The method according to claim 1, wherein the first aggregation range covers an interval of locations having a width which is different from a width of an interval covered by the second aggregation range.

3. The method according to claim 1, wherein the setting at least one of the variable first aggregation range and the second aggregation range to respective start aggregation range values comprises:
setting a first variable interval to a first start interval value;
setting a second variable interval to a second start interval value;
wherein the first aggregation range includes locations between the target location and a first location which is by the first variable interval behind the target location,
wherein the second aggregation range includes locations between a second location, which is by the second variable interval in front of the target location, and the target location,
wherein the value of the first variable interval is varied to a first final interval value and the value of the second variable interval is varied to a second final interval value until the criterion is satisfied.

4. The method according to claim 3, wherein at least one of the following holds:
the first final interval value is different from the second final interval value;
the first start interval value is different from the second start interval value.

5. The method according to claim 3, wherein at least one of the following holds:
the first final interval value is equal to the second final interval value;
the first start interval value is equal to the second start interval value.

6. The method according to claim 3, wherein at least one of the first start interval value and the second start interval value is a predetermined minimal interval value, and varying at least one of the value of the first variable interval and the value of the second variable interval involves increasing at least one of the value of the first variable interval and the value of the second variable interval from the minimal interval value.

7. The method according to claim 3, wherein at least one of the first start interval value and the second start interval value is a predetermined maximal interval value, and varying at least one of the value of the first variable interval and the value of the second variable interval involves decreasing at least one of the value of the first variable interval and the value of the second variable interval from the maximal interval value.

8. The method according to claim 3, wherein at least one of the first start interval value and the second start interval value and the first final interval value and the second final interval value is dependent on at least one of the target location and time and at least one signal associated with the target location determined for a past time.

9. The method according to claim 3, wherein the smaller the signal associated with the target location is due to fading, the larger at least one of the first start interval value and the second start interval value and the first final interval value and the second final interval values is selected.

10. The method according to claim 1, wherein determining whether the criterion is satisfied involves:
determining that the signal associated with the target location is above a noise level.

11. The method according to claim 1, wherein determining whether the criterion is satisfied involves at least one of:
determining that a first location lies in a region behind an end of the fiber,
determining that a second location lies in a region in front of the fiber.

12. The method according to claim 3, wherein determining whether the criterion is satisfied involves:
determining that at least one of the value of the first variable interval and the value of the second variable interval is larger than a maximal interval value.

13. The method according to claim 1, wherein determining whether the criterion is satisfied involves:
determining that at least one of the first aggregation range and the second aggregation range includes at least one other target location for which a significant signal has already been determined.

14. The method according to claim 3, wherein the method is performed looping over all target locations with at least one of the first start interval value and the second start interval value, modifying at least one of the value of the first variable interval and the value of the second variable interval and looping over all target locations, thereby skipping those target locations for which the criterion is satisfied.

15. An arrangement for determining strain change in an optical fiber, the arrangement comprising:
a light source configured to inject a pulsed radiation into the optical fiber;
equipment for interfering the radiation backscattered from plural locations within the fiber with a reference radiation;
a detector configured to detect plural intensities of the interfered radiation associated with the plural locations;
a processor configured to:
derive plural temporal phase changes based on the plural intensities; and perform for any target location along the fiber:
setting at least one of a variable first aggregation range and a second aggregation range to respective start aggregation range values;
a) deriving a first phase aggregation value based on plural temporal phase changes of radiation returning from the first aggregation range including locations behind the target location;
b) deriving a second phase aggregation value based on plural temporal phase changes of radiation travelled to the second aggregation range including locations in front of the target location;

c) determining a signal associated with the target location based on a phase aggregation value difference between the first phase aggregation value and the second phase aggregation value; and performing the above steps a), b), c) while varying at least one of the first aggregation range value and the second aggregation range value to respective final aggregation range values until a criterion is satisfied.

* * * * *